United States Patent [19]
Sayous

[11] 3,803,636
[45] Apr. 9, 1974

[54] SIGNAL-RECORDING APPARATUS WITH CIRCULAR OSCILLATING ELECTRODE

[75] Inventor: Leon Sayous, Pau, France

[73] Assignee: Societe Anonyme dite: Societe Nationale des Petroles D'Aquitaine, Courbevoie, France

[22] Filed: Aug. 18, 1972

[21] Appl. No.: 281,661

[30] Foreign Application Priority Data
Aug. 19, 1971 France .............................. 71.30248

[52] U.S. Cl............................ 346/74 E, 346/139 C
[51] Int. Cl. .......................................... G01d 15/18
[58] Field of Search............ 346/74 E, 8, 58, 139 C, 346/117 R; 179/100.2 T

[56] References Cited
UNITED STATES PATENTS
| | | | |
|---|---|---|---|
| 3,434,159 | 3/1969 | Erdman | 346/139 C |
| 2,827,619 | 3/1958 | Fryklund | 346/74 E |
| 3,257,222 | 6/1966 | Carlson | 346/74 ES |

Primary Examiner—Bernard Konick
Assistant Examiner—Jay P. Lucas
Attorney, Agent, or Firm—Brisebois & Kruger

[57] ABSTRACT

Described herein is apparatus for recording information about phenomena represented by electric signals, comprising means for intermittently advancing an electro-sensitive strip between a movable electrode and a fixed electrode, wherein the movable electrode is curved and is given an oscillatory movement.

7 Claims, 4 Drawing Figures

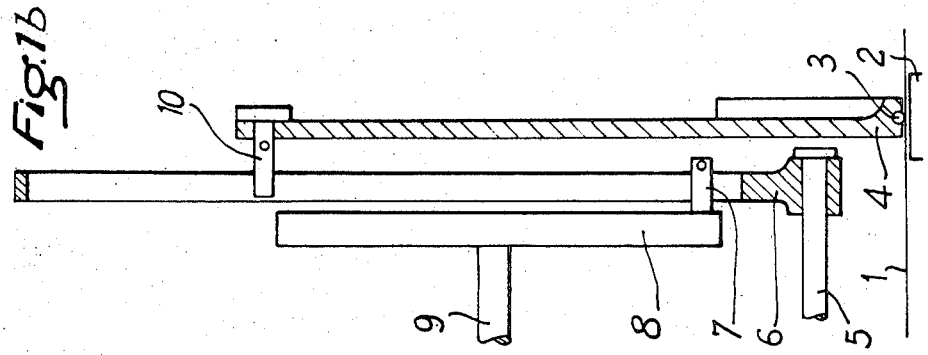
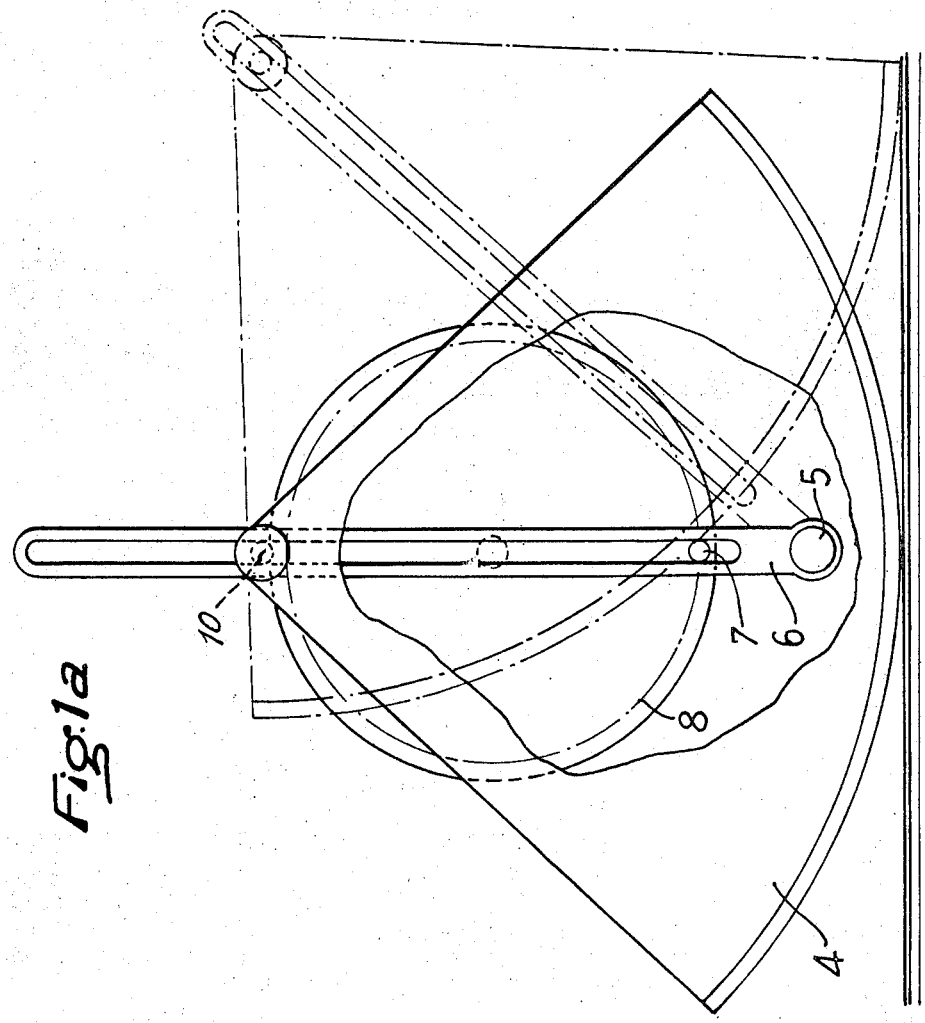

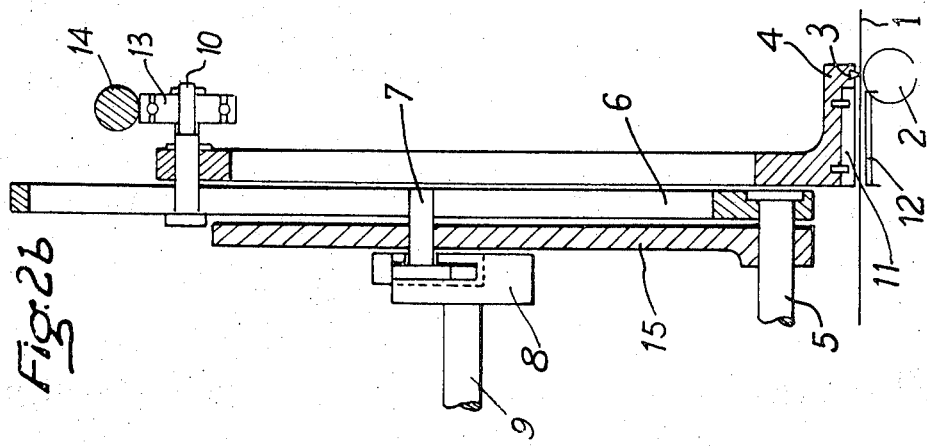
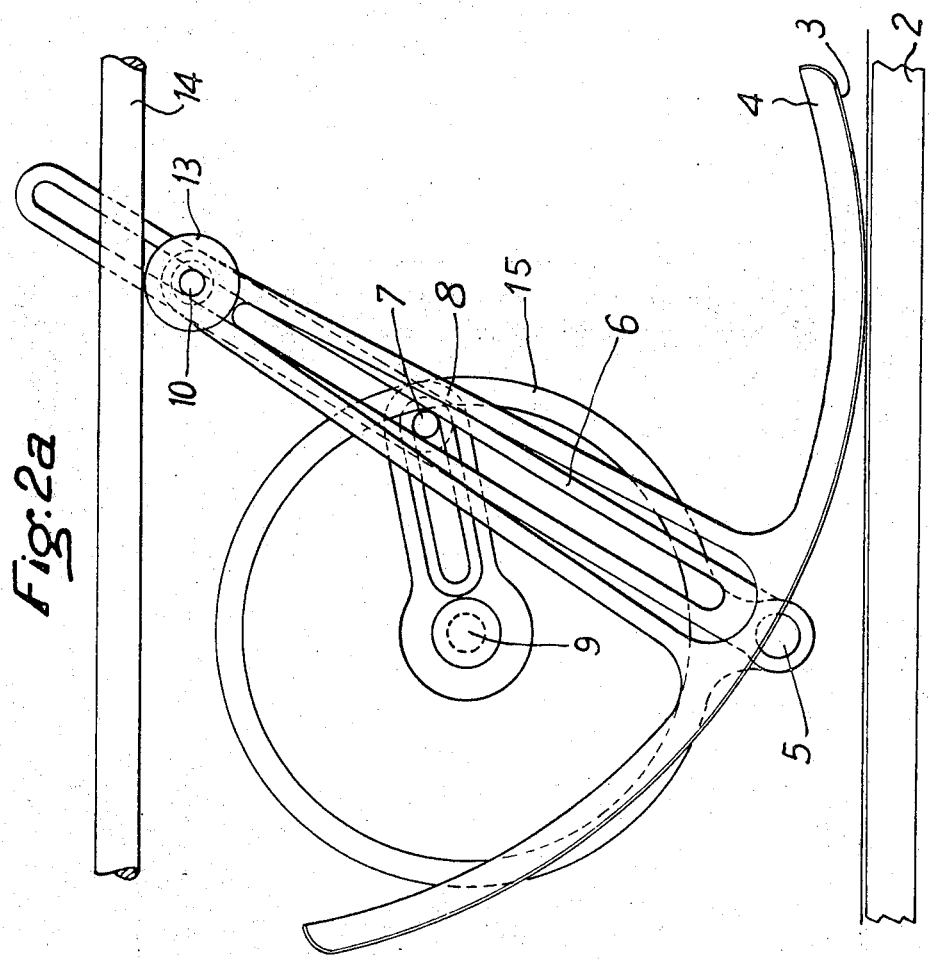

SIGNAL-RECORDING APPARATUS WITH CIRCULAR OSCILLATING ELECTRODE

The present invention relates to apparatus for recording signals which are in the form of electric signals of a determined duration.

Recording apparatus for recording such signals are used in a number of different fields. These include, for example, seismic exploration, surveying the sea bed and generally for recording any phenomena of which the value to be determined can be represented by the instant and the duration of appearance of a signal which is an image of or represents in some way the phenomenon to be studied.

It is an object of the invention to provide improved reading apparatus for such uses.

It is a further object of the invention to provide recording apparatus which is particularly suitable for use in seismic and under water surveying or exploration.

The recording apparatus of the present invention is of the electro-sensitive ribbon or tape type, which operates on the principle of passing a current through the thickness of an electro-sensitive tape, for example, paper; this is done using a first electrode and a second electrode, which are placed on opposite sides of the tape. The passage of the current causes, for example, the blackening of the paper and relative movement between the paper and the first electrode make it possible to establish the duration of the phenomenon of which the electric impulse or signal forms an image.

Among existing recording apparatus of the electro-sensitive paper type, the apparatus which is best adapted to the recording of short-term phenomena is that in which the paper remains fixed during the inscribing operation and is only displaced in the interval between two inscriptions. A stylus, which forms the first electrode, is displaced in a direction perpendicular to the direction of displacement of the paper so as to scan the width of the latter. The stylus could be mounted on the circumference of a rotatable disc which is positioned in a plane parallel to the plane of the paper, and in this case the traces which are obtained are curved traces.

Such recording apparatus which uses a stylus has the disadvantage that it tends to cause tearing of the paper, while the curved traces are not always desirable.

Attempts have been made to overcome this difficulty but these have generally been complicated and subject to other disadvantages or limitations. It is an object of this invention to overcome or reduce these.

According to the present invention an apparatus is provided for recording phenomena having a value or characteristic to be measured or studied which is representated by the time and the duration of a signal, the apparatus comprising a first electrode, a movable member carrying this first electrode, a fixed support which forms a second electrode, and means for passing an electro-sensitive tape in successive steps between the electrodes, wherein the first electrode is curved and driving means are provided for giving an oscillatory movement to this electrode.

In one preferred arrangement the first electrode is in the form of a strip or wire which is fixed to the periphery of a sector- or anchor-shaped member.

According to one particular embodiment the oscillatory movement of the first electrode is given to it by driving means which comprise a disc or link 8 (see FIGS. 1a and 1b) mounted on a shaft 9 by which it is rotated, a slotted arm 6 which is pivotable about a fixed point 5 situated at its lower end and which has a longitudinal slot along the major part of its length, in which slot there slides freely a driving pin 7 mounted on the disc or link 8 and a pin 10 which is mounted on the disc sector or anchor member 4 which carries the first electrode 3.

The need sometimes arises of taking into account the representation of the phenomenon being measured or studied by a recording the scanning speed of which is not uniform but conforms to a time law which is known in advance. An example of such a case could arise each time that it is desired to condense into a minimum amount of space available for recording a survey some parts of a phenomenon, while one or several other parts of the phenomenon must on the contrary be developed in greater detail.

The recording apparatus in which phenomena the values of which to be measured are represented by the instant and the duration of the appearance of a signal, in accordance with the invention, can be made so that a recording can be obtained in which the scanning speed is programmed in accordance with a predetermined time law. Such apparatus may comprise a mechanical system for producing an incremental advance of the electro-sensitive paper and means for operating the curved inscription member or electrode which comprises:

a driving member 8 which is rotated about a fixed shaft 9 and is formed with a longitudinal slot;

a slotted arm 6 which pivots about a fixed pivot 5 at its lower end, and which has a longitudinal groove or slot in which pins slide freely;

a cam disc 15 which is held in position at the fixed pivot 5 and the contour of which provides a cam profile representing the predetermined time law;

a free pin 7 which is pressed by means of a spring against the internal surface of the disc 15 and which extends into the slots of the member 8 and of the arm 6;

a disc-shaped or anchor-shaped sector member 4 which carries the curved electrode strip 3 and the top end of which is fast with a pin 10 which slides freely in the longitudinal slot of the arm 6.

Further features of the invention will be apparent from the following description, taken with the accompanying drawings which represent two preferred embodiments of the invention. In the drawings:

FIGS. 1a and 1b show diagrammatically, in front elevation and side elevation, respectively, recording apparatus which includes a rotary driving disc;

FIGS. 2a and 2b show in front elevation and side elevation, respectively, recording apparatus which includes a cam disc enabling the scanning to be carried out at a non-uniform speed and in accordance with the time law which is represented by the profile of the cam disc.

The apparatus which is shown in FIGS. 1a and 1b comprises a sector-shaped member 4 which is provided at its periphery with a strip or wire 3 forming the first electrode, and with a pin 10 by means of which it is given an oscillatory movement.

This pin 10 slides freely in a longitudinal slot in an arm 6 which arm pivots freely about a fixed shaft 5. An oscillatory movement is given to the arm 6 by a driving pin 7 mounted on a driving disc 8 which is driven by means of a fixed negative base electrode 2.

To operate the apparatus, the disc 8 is rotated and this produces, by means of the pin 7, a pivoting of the arm 6 and the scanning by the conductive wire 3 of the full width of the recording paper 1. A trace is produced on the paper by current passed between the wire 3 and the negative base electrode 2.

The return of the member 4 to its initial position takes place while the driving disc 8 continues to rotate, due to the effect of the arm 6, which transforms the rotational movement of the disc 8 into a reciprocatory movement.

The speed during scanning and recording has the advantage of being higher than the speed of the return of the member 4 to its starting position.

In effect, due to the oscillatory movement of the arm 6 being dependent on the action of the driving pin 7 and the shaft 5, it is possible to make the distance covered by the arm during the shortest part of the circle inscribed by the pin 7 during its rotation correspond to the recording phase, the other longer portion then corresponding to the return of the arm to its initial position. For a constant angular speed w, at which the pin 7 is turning, the return will be effected at a speed higher than the scanning and recording speed.

FIGS. 2a and 2b show one particular embodiment which comprises a device permitting the scanning speed to be varied in non-uniform manner.

As previously described the apparatus comprises a member 4 carrying an electrode 3 in the form of a wire or strip. The member 4 is in the form of an anchor, the pivot end of which carries the pin 10 by means of which the oscillatory movement is imparted to the member 4. This pin slides freely inside the longitudinal slot of the slotted arm 6, which arm pivots freely about the fixed shaft 5. This shaft 5 also carries a cam disc 15, which may, for example, be in the form of a ring the internal face of which has a profile corresponding to the pre-established time law.

The arm 6 is given an oscillatory movement by means of the pin 7, which is given an annular travel by means of the member 8 having a slot in which the pin engages. This serves to make the movement of the arm 6 and of the member 4 which it drives dependent on the particular profile of the disc 15. For this purpose, a spring presses the pin 7 against the internal profile or surface of the disc 15 so that the path of the pin matches the shape of the cam surface.

In order to ensure a strictly horizontal translatory movement of the pin 10, this can be mounted in a guide bearing 13 which, rolling on a guide rod 14, ensures that the correct scanning is obtained without the member 4 and its inscribing wire 3 slipping off the recording paper. Such scanning can also be effected by using a pad of magnetic material 11 co-operating with a steel plate 12 on which the recording paper is placed.

The operation of the recording apparatus in accordance with this modification is generally similar to that of the apparatus previously described. The profile carried by the cam disc 15 permits, firstly, the return of the member 4 to its initial position to be effected at a speed which is faster than the scanning speed and, secondly, scanning can be operated at different speeds as a function of the portions of the survey, for example, at a higher speed during the first moments following the emission of the sound signal and then at a slower speed at the time of return of the echo and the recording of the signal.

The invention also covers other embodiments which reproduce the principle of the invention without departing from the scope thereof.

I claim:

1. In apparatus for recording phenomena having a value to be measured, which value is represented by the time and duration of an electrical signal, said apparatus comprising a movable electrode, a stationary electrode, and means for advancing an electro-sensitive tape in successive steps between said electrodes, the improvement according to which
    said movable electrode has the shape of a portion of a circle, and said apparatus is provided with driving means for imparting to said movable electrode an oscillatory movement about the center of said circle, said driving means comprising
    a movable member carrying said movable electrode,
    a slotted arm mounted to oscillate about a stationary point near one of its ends,
    a rotatably mounted member and a first pivot pin slidably engaged in said slot and connected to be driven by said rotatably mounted member in a path extending around the axis of rotation of said rotatably mounted member, and
    a second pivot pin slidably engaged in said slot and attached to said movable electrode carrying member.

2. Apparatus as claimed in claim 1 comprising a guide member positioned to guide said second pivot pin in a translational path parallel to said stationary electrode.

3. Apparatus as claimed in claim 1 in which said rotatably mounted member is a second slotted arm mounted to rotate about a fixed point, said first pivot pin being mounted to slide in the slots in both slotted arms, and said apparatus further comprises a cam along which said first pivot pin travels as it is driven by said rotatably mounted member.

4. Apparatus according to claim 1, wherein the periphery of the member carrying said movable electrode has arranged thereon a pad of magnetic material co-operating with a metallic support for the electro-sensitive tape so as to ensure the scanning of the latter by the movable electrode with the prevention of slipping.

5. Apparatus according to claim 1, wherein the movable electrode is in the form of a conductive wire mounted on the said movable member.

6. Apparatus according to claim 5, wherein the said movable member comprises a sector of a disc having the movable electrode mounted in its periphery.

7. Apparatus as claimed in claim 5 in which said movable member comprises an arcuate support transversely mounted at the end of an arm, with said movable electrode mounted along the periphery of said arcuate support.

* * * * *